United States Patent US 10,712,736 B2
Avritch et al. Jul. 14, 2020

(54) CONTROLLING AN AIRCRAFT COMPRISING A PLURALITY OF LOADABLE CONFIGURATION SEVER DATA BASED ON DETECTING ONE OR MORE DIAGNOSTIC TEST INTERFACES

(71) Applicant: Hamilton Sundstrand Corporation, Charlotte, NC (US)

(72) Inventors: Steven A. Avritch, Bristol, CT (US); Christopher Brian Noll, Glastonbury, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 1 day.

(21) Appl. No.: 16/110,192

(22) Filed: Aug. 23, 2018

(65) Prior Publication Data
US 2020/0064824 A1 Feb. 27, 2020

(51) Int. Cl.
G06F 3/00 (2006.01)
G05B 23/02 (2006.01)
H02H 7/20 (2006.01)
H02H 7/26 (2006.01)

(52) U.S. Cl.
CPC .......... G05B 23/0286 (2013.01); H02H 7/20 (2013.01); H02H 7/261 (2013.01)

(58) Field of Classification Search
CPC ................................. G05B 23/0286
See application file for complete search history.

(56) References Cited

U.S. PATENT DOCUMENTS

| 5,410,668 | A | 4/1995 | Hilton |
| 9,413,162 | B2 | 8/2016 | Brouwer et al. |
| 9,686,363 | B2* | 6/2017 | Morikawa ......... H04L 12/40189 |
| 9,828,107 | B1* | 11/2017 | Ruymgaart .......... G05D 1/0077 |
| 10,328,872 | B2* | 6/2019 | Eldridge ............. B60R 16/0207 |
| 2007/0255430 | A1 | 11/2007 | Sharma et al. |
| 2011/0087343 | A1 | 4/2011 | Kamenetz et al. |
| 2012/0316728 | A1 | 12/2012 | Jacobi et al. |
| 2019/0337634 | A1* | 11/2019 | Geiger ................. G05D 1/0833 |

FOREIGN PATENT DOCUMENTS

WO 2013052945 A2 4/2013

OTHER PUBLICATIONS

EP Application No. 19191824.2 Extended EP Search Report dated Feb. 28, 2020, 8 pages.

* cited by examiner

*Primary Examiner* — Tammara R Peyton
(74) *Attorney, Agent, or Firm* — Cantor Colburn LLP

(57) ABSTRACT

According to an aspect, a sever system includes a non-volatile storage device with a plurality of loadable configuration data and a configurable sever logic circuit configured responsive to a transfer of the loadable configuration data to perform a plurality of operations. The operations include mapping a plurality of module-level sever logic inputs to a plurality of module-specific sever logic functions as defined in the loadable configuration data. The module-level sever logic inputs are monitored by the configurable sever logic circuit based on the module-specific sever logic functions for a sever condition. A sever command to disconnect one or more outputs of a plurality of modules is triggered based on the module-specific sever logic functions and the module-level sever logic inputs.

17 Claims, 4 Drawing Sheets

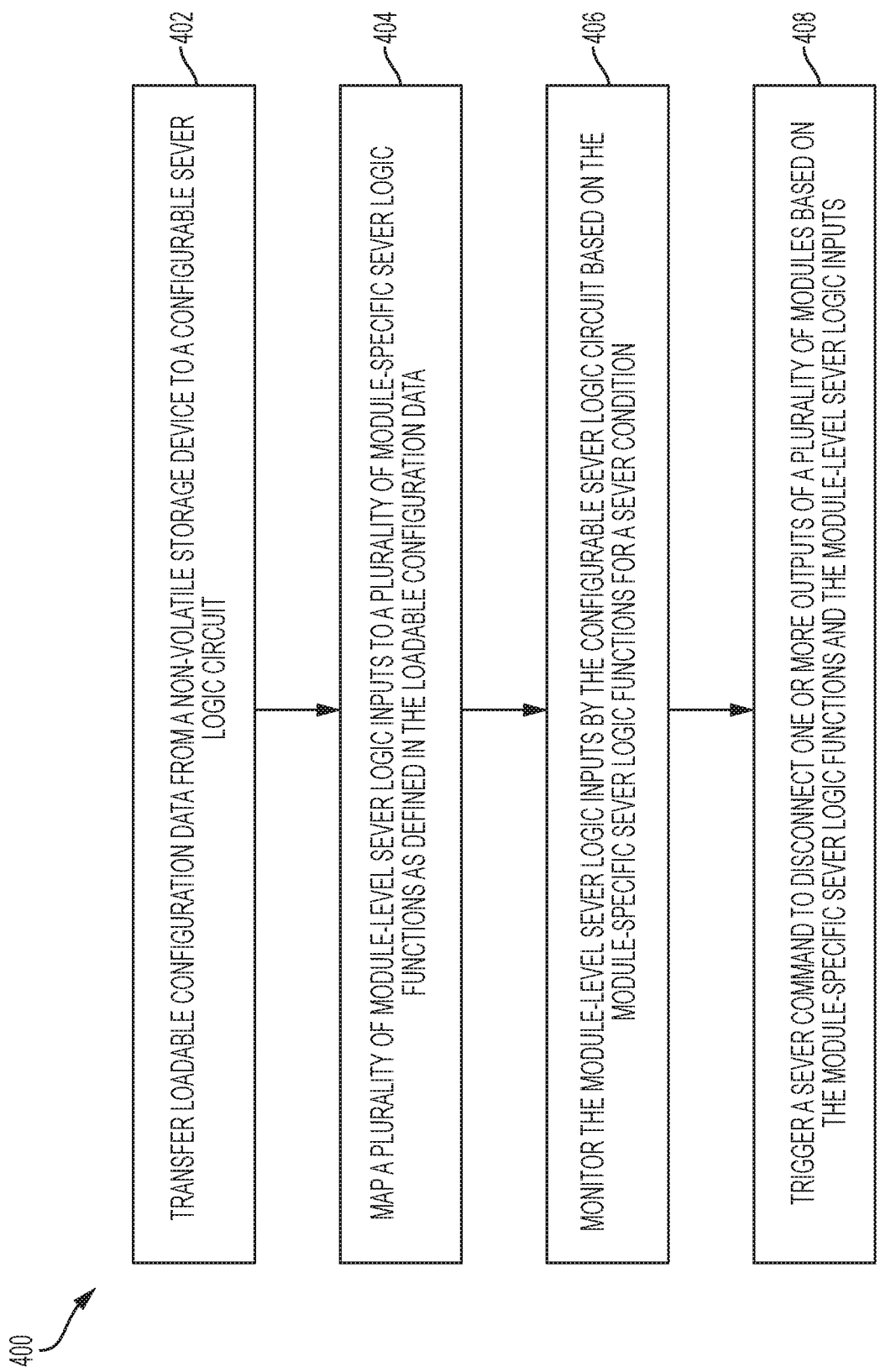

CONTROLLING AN AIRCRAFT COMPRISING A PLURALITY OF LOADABLE CONFIGURATION SEVER DATA BASED ON DETECTING ONE OR MORE DIAGNOSTIC TEST INTERFACES

BACKGROUND

The subject matter disclosed herein generally relates to the field of control systems, and more particularly to a method and apparatus for a configurable sever system.

Critical embedded controllers typically include sever logic that disables controller outputs when normal processing functions of the controller have malfunctioned. Sever logic varies between controller designs and is typically customized in a fixed format for a desired end use or application.

BRIEF SUMMARY

According to one embodiment, a sever system is provided. The sever system includes a non-volatile storage device with a plurality of loadable configuration data and a configurable sever logic circuit configured responsive to a transfer of the loadable configuration data to perform a plurality of operations. The operations include mapping a plurality of module-level sever logic inputs to a plurality of module-specific sever logic functions as defined in the loadable configuration data. The module-level sever logic inputs are monitored by the configurable sever logic circuit based on the module-specific sever logic functions for a sever condition. A sever command to disconnect one or more outputs of a plurality of modules is triggered based on the module-specific sever logic functions and the module-level sever logic inputs.

In addition to one or more of the features described above, or as an alternative, further embodiments may include where the configurable sever logic circuit is incorporated in a controller line replaceable unit and the modules include circuit boards within the controller line replaceable unit.

In addition to one or more of the features described above, or as an alternative, further embodiments may include where the module-specific sever logic functions include combinational logic that defines one or more conditions to trigger disconnection of the one or more outputs of the modules.

In addition to one or more of the features described above, or as an alternative, further embodiments may include where the module-level sever logic inputs include results of one or more diagnostic tests performed by one or more local module sever logic circuits of the modules.

In addition to one or more of the features described above, or as an alternative, further embodiments may include where the triggering of the at least one sever command to disconnect the one or more outputs of the modules is further based on a remote sever status indicative of a secondary controller capability to control one or more effectors associated with the one or more outputs.

In addition to one or more of the features described above, or as an alternative, further embodiments may include where a status of the at least one sever command is provided to the secondary controller.

In addition to one or more of the features described above, or as an alternative, further embodiments may include where the triggering of the at least one sever command to disconnect the one or more outputs of the modules is further based on an external sever command in combination with the remote sever status and the module-level sever logic inputs.

According to an embodiment, a control system for an aircraft includes a plurality of effectors and a controller line replaceable unit of the aircraft operably coupled to the effectors. The controller line replaceable unit includes a non-volatile storage device including a plurality of loadable configuration data and a configurable sever logic circuit configured responsive to a transfer of the loadable configuration data to perform a plurality of operations. The operations include mapping a plurality of module-level sever logic inputs to a plurality of module-specific sever logic functions as defined in the loadable configuration data, monitoring the module-level sever logic inputs by the configurable sever logic circuit based on the module-specific sever logic functions for a sever condition, and triggering at least one sever command to disconnect one or more outputs of a plurality of modules based on the module-specific sever logic functions and the module-level sever logic inputs.

In addition to one or more of the features described above, or as an alternative, further embodiments may include where the module-specific sever logic functions include combinational logic that defines one or more conditions to trigger disconnection of the one or more outputs of the modules, and the modules include circuit boards within the controller line replaceable unit.

In addition to one or more of the features described above, or as an alternative, further embodiments may include where the triggering of the at least one sever command to disconnect the one or more outputs of the modules is further based on a remote sever status indicative of a secondary controller capability to control one or more effectors associated with the one or more outputs, and a status of the at least one sever command is provided to the secondary controller.

According to an embodiment, a method includes transferring a plurality of loadable configuration data from a non-volatile storage device to a configurable sever logic circuit. A plurality of module-level sever logic inputs is mapped to a plurality of module-specific sever logic functions as defined in the loadable configuration data. The module-level sever logic inputs are monitored by the configurable sever logic circuit based on the module-specific sever logic functions for a sever condition. A sever command is triggered to disconnect one or more outputs of a plurality of modules based on the module-specific sever logic functions and the module-level sever logic inputs.

In addition to one or more of the features described above, or as an alternative, further embodiments may include where the one or more diagnostic tests include one or more of: a watchdog timer test, a power supply test, a current test, a voltage test, a temperature test, a processing system test, a memory system test, a communication system test, an interface test, an input/output test, and a clock frequency/drift test.

Technical effects of embodiments of the present disclosure include a configurable sever logic circuit that enables re-use across a variety of platforms having different system configurations and to selectively disconnect outputs of a control system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

FIG. 4 is a flow diagram of a method, according to an embodiment of the present disclosure.

DETAILED DESCRIPTION

A detailed description of one or more embodiments of the disclosed apparatus and method are presented herein by way of exemplification and not limitation with reference to the Figures.

Figure 1:
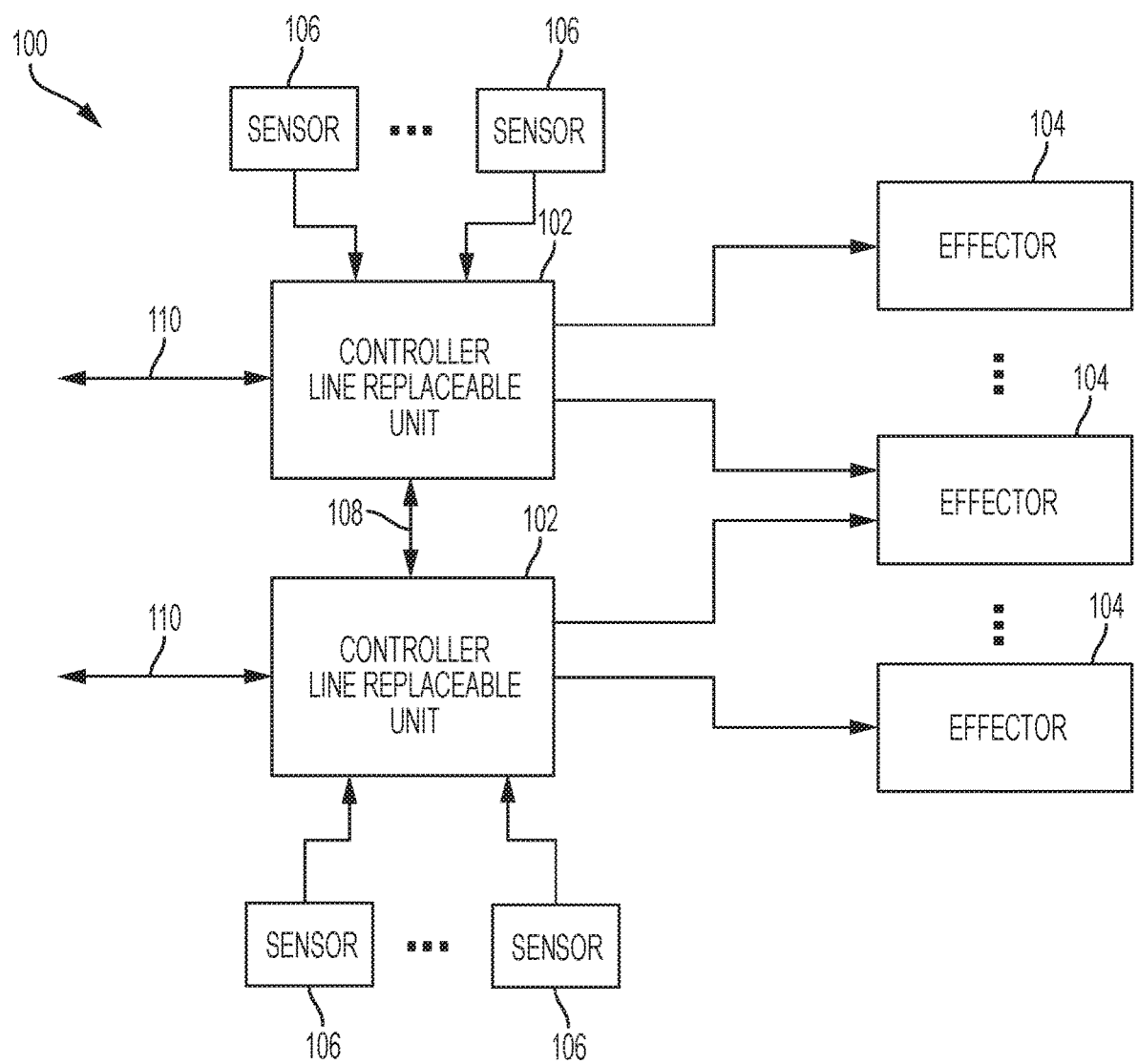
FIG. 1 is a schematic representation of a control system, according to an embodiment of the present disclosure.

FIG. 1 is a schematic representation of a control system 100 including a plurality of controller line replaceable units (LRUs) 102 operable to control one or more effectors 104 and monitor one or more sensors 106. The term "LRU" refers to a component that is designed to be rapidly replaced at an operating location in the field with an equivalent component to restore operational performance, typically with quick-release fittings and minimal tooling requirements. The example of FIG. 1 is a dual-channel control system, where the controller LRUs 102 can exchange data with each other on a cross-channel data link and cross-channel status discretes 108. The controller LRUs 102 may also interface with one or more external systems (not depicted) via communication links 110 to receive and send data and commands external to the control system 100. As one example, the control system 100 can be part of an aircraft, such as a flight control system, propulsion control system, environmental control system, or other such system. Alternatively, the control system 100 can be incorporated in industrial machinery, an elevator system, a vehicle system, or other such systems with safety-critical applications.

The effectors 104 can be any type of electrical or electro-mechanical actuation devices/systems. For instance, the effectors 104, can be solenoids, relays, motors, pumps, valves, indicators, or other such devices capable of controlling position, pressure, or motion, including discrete, linear, rotary, and/or oscillatory responses. One or more of the effectors 104 can be a single channel effector controlled by one of the controller LRUs 102, and one or more of the effectors 104 can be a multi-channel effector controlled by two or more of the controller LRUs 102. For instance, a multi-channel effector 104 may be controlled by two or more controller LRUs 102 providing a partial command/current source or a single one of the controller LRUs 102 providing a full command/current source.

The sensors 106 can be any type of sensing device to observe feedback and conditions for control and monitoring purposes. For example, the sensors 106 can include linear position sensors, rotatory position sensors, pressure sensors, flow rate sensors, current sensors, voltage sensors, level sensors, accelerometers, photovoltaic sensors, discrete inputs, and other such sensing devices known in the art. The sensors 106 can include substantially redundant information provided to each of the controller LRUs 102 to support voting or blending of multiple observed values, for instance, where cross-channel data values are exchanged between the controller LRUs 102 on the cross-channel data link and cross-channel status discretes 108.

The communication links 110 can report data and status observed by the controller LRUs 102 to a higher-level control or data management system. For example, in the context of an aircraft, the communication links 110 can interface with an air data computer, cockpit instrumentation, a vehicle system bus, and/or other interfaces operable to command actions by the controller LRUs 102 and process data and status generated by the controller LRUs 102.

Figure 2:
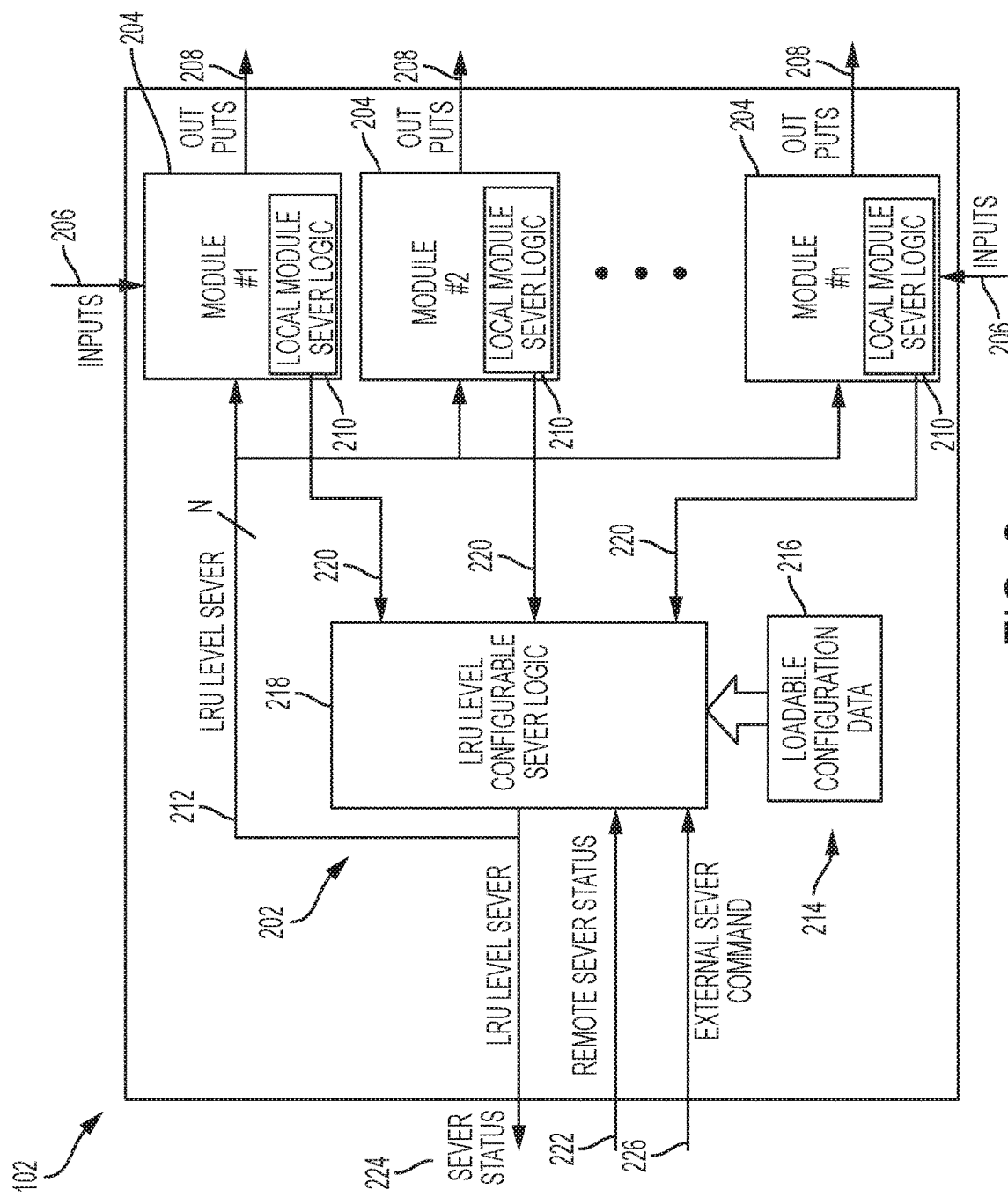
FIG. 2 is a block diagram of components of a controller line replaceable unit, according to an embodiment of the present disclosure.

FIG. 2 depicts an example of one of the controller LRUs 102 of FIG. 1 with respect to various components within the controller LRU 102. In the example of FIG. 2, the controller LRU 102 includes a sever system 202 and a plurality of modules 204 (e.g., 1 through n modules 204, where n is an arbitrary number). The modules 204 can be circuit boards within the controller LRU 102, while the sever system 202 may be part of a backplane or located on a circuit board of the controller LRU 102. The modules 204 can be partitioned in any arrangement and need not represent physically separate circuit boards. For instance, the each of the modules 204 may include one or more circuit boards, one or more components on one or more circuit boards, or one or more functions of the controller LRU 102 that may be physically combined with other functions within one or more components on one or more circuit boards. The modules 204 can be reuse modules that are reused on a variety of programs and applications having different configurations. For example, the numbers and types of inputs and outputs can vary between configurations, and the modular approach of modules 204 can be adjusted to match configuration needs as required. There can be spare interfaces within the modules 204 to provide flexibility. Further, the mapping of inputs and outputs between channels can vary between the controller LRUs 102 within the control system 100 of FIG. 1. For instance, the modules 204 can include a processing system circuit board, a memory system/long-term storage circuit board, an analog input/output circuit board, a digital input/output circuit board, a communication system circuit board, a power supply circuit board, and other such circuit boards. Each of the modules 204 can accept one or more inputs 206 and control one or more outputs 208; however, some modules 204 may not directly receive inputs 206 from a source external to the controller LRU 102. The inputs 206 can include sensor data from the sensors 106 of FIG. 1, and the outputs 208 may drive the effectors 104 of FIG. 1.

The modules 204 can also include one or more local module sever logic circuits 210. The local module sever logic circuits 210 can include one or more diagnostic test interfaces that support testing local to the modules 204. The types of localized testing tracked through the local module sever logic circuits 210 can vary depending upon the type of each of the modules 204. For instance, processing system tests can be different from power supply tests, and communication system tests can vary from memory system tests. Further, discrete input/output tests can differ from analog input/output tests. Examples of the types of diagnostic tests that may be performed or monitored through the local module sever logic circuits 210 can include, for instance, one or more of: a watchdog timer test, a power supply test, a current test, a voltage test, a temperature test, a processing system test, a memory system test, a communication system test, an interface test, an input/output test, and a clock frequency/drift test. It will be understood that any type of diagnostic test that may result in depowering or severing one or more of the outputs 208 can be supported through the local module sever logic circuits 210 and is not limited to the examples provided herein. Decisions to sever one or more outputs 208 can be complex and may involve considering factors across multiple modules 204, data between multiple controller LRUs 102 and/or external data from the communication links 110. In embodiments, sever decisions are made by the sever system 202, with one or more resulting sever commands 212 flowed back to targeted instances of the modules 204 to selectively disconnect outputs 208, for instance, to protect the effectors 104 of FIG. 1 from damage or causing a safety issue.

In the example of FIG. 2, the sever system 202 includes a non-volatile storage device 214 configured to store a plurality of loadable configuration data 216. The sever system 202 also includes a configurable sever logic circuit 218 configured responsive to a transfer of the loadable configuration data 216 to perform a plurality of operations. The configurable sever logic circuit 218 may include, for example, combinational logic that defines one or more conditions to trigger disconnection of the one or more outputs 208 of the modules 204. The configurable sever logic circuit 218 can map a plurality of module-level sever logic inputs 220 to a plurality of module-specific sever logic functions as defined in the loadable configuration data 216. The module-level sever logic inputs 220 can include results of one or more diagnostic tests performed by one or more local module sever logic circuits 210 of the modules 204. The configurable sever logic circuit 218 is operable to monitor the module-level sever logic inputs 220 based on the module-specific sever logic functions for a sever condition. The configurable sever logic circuit 218 can trigger at least one sever command 212 to disconnect one or more outputs 208 of modules 204 based on the module-specific sever logic functions and the module-level sever logic inputs 220. The configurable aspect of the loadable configuration data 216 enables customized responses to the module-level sever logic inputs 220 and/or other inputs, which may range from only reporting a fault (e.g., no sever) to severing one or more corresponding outputs 208 (e.g., severing between one and all of the outputs 208). In embodiments, the configurable sever logic circuit 218 can be an application specific integrated circuit (ASIC), a field programmable gate array (FPGA), or the like, which includes basic logic functions and/or gates to rapidly trigger severing of the outputs 208 without extended delays or complexity that may be associated with a microprocessor based solution.

Triggering of at least one sever command 212 to disconnect the one or more outputs 208 of the modules 204 can also be based on a remote sever status 222 indicative of a secondary controller (e.g., another instance of the controller LRU 102) capability to control one or more effectors 104 associated with the one or more outputs 208. Conversely, a status 224 of the at least one sever command 212 can be provided to the secondary controller, for instance, on the cross-channel data link and cross-channel status discretes 108 and/or to an external system via communication links 110 of FIG. 1. Further, triggering of at least one sever command 212 to disconnect the one or more outputs 208 of the modules 204 can also or alternatively be based on an external sever command 226 in combination with the remote sever status 222 and the module-level sever logic inputs 220. Examples of sever logic implemented by the configurable sever logic circuit 218 are further described with respect to FIG. 3.

Figure 3:
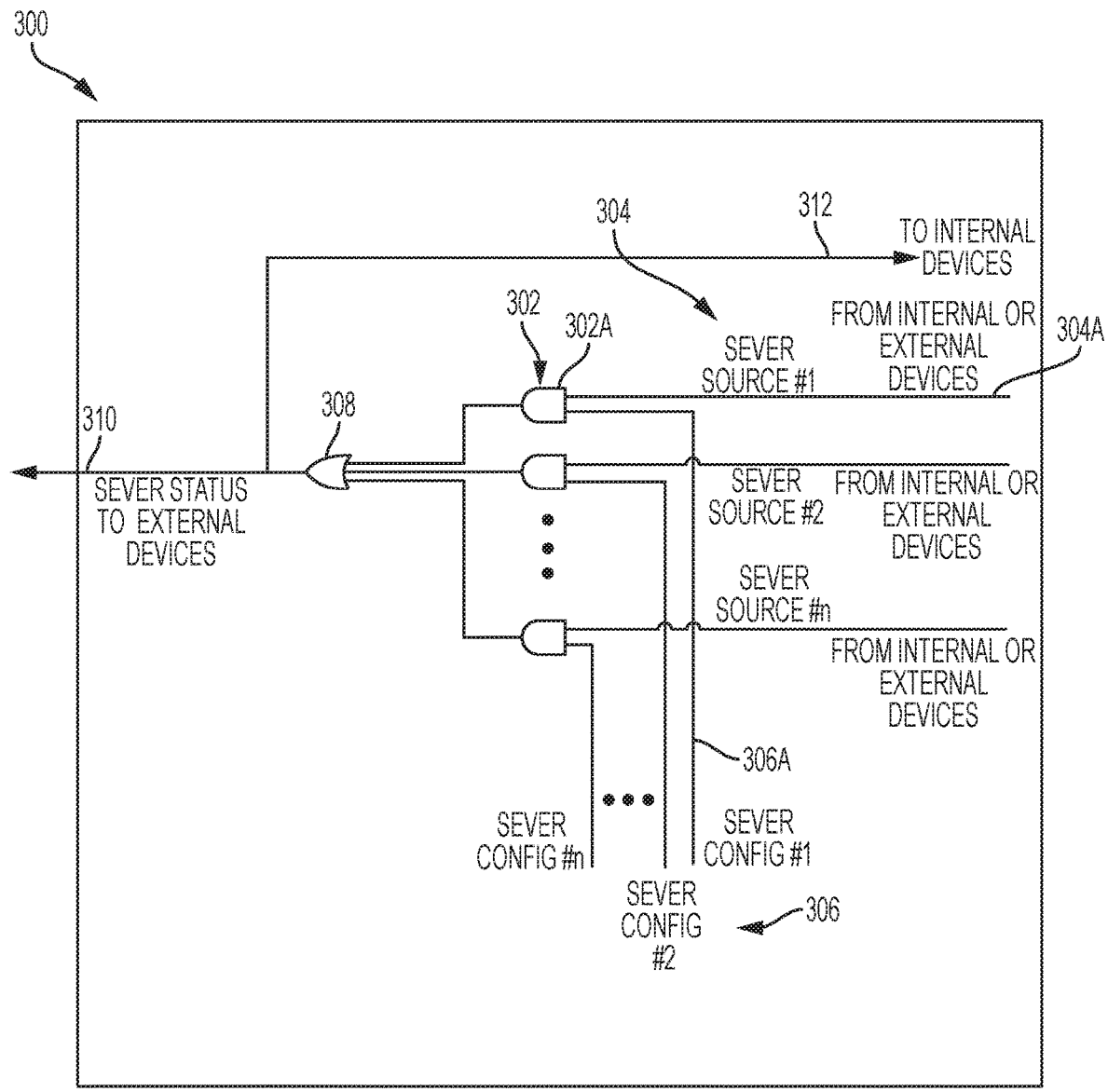
FIG. 3 is a block diagram of configurable sever logic, according to an embodiment of the present disclosure.

FIG. 3 is an example of a block diagram 300 of the configurable sever logic circuit 218 in more detail. In the example of FIG. 3, a plurality of AND-gates 302 receive inputs from sever sources 304 and sever configuration selections 306. The sever sources 304 can include the module-level sever logic inputs 220 of FIG. 2, the remote sever status 222 of FIG. 2, the external sever command 226 of FIG. 2, and/or other signals from internal or external devices with respect to the controller LRU 102 of FIG. 2. The sever configuration selections 306 can include encoded values from the loadable configuration data 216 of FIG. 2. Outputs of the AND-gates 302 can be logically combined at an OR-gate 308 to drive an external sever status 310 to one or more external devices and an internal sever status 312 to one or more internal devices with respect to the controller LRU 102. For example, the external sever status 310 can map to the status 224 of FIG. 2, and the internal sever status 312 can map to at least one sever command 212 of FIG. 2.

As one example, an AND-gate 302A can perform a logical AND function on a sever source 304A from a first one of the modules 204 of FIG. 2 with a sever configuration selection 306A from the loadable configuration data 216 of FIG. 2. Thus, the sever configuration selection 306A acts as an enable signal as to whether the state of the sever source 304A can propagate to the OR-gate 308. The sever configuration selections 306 may be bit mapped such that a single 32-bit word stored in the loadable configuration data 216 of FIG. 2 can enable or disable up to thirty-two of the AND-gates 302 in parallel. The OR-gate 308 functions as a logical OR, such that if any of the AND-gates 302 outputs a logical '1', the external sever status 310 and the internal sever status 312 would correspondingly be set to a logical '1' in this example.

Although depicted as an OR-of-ANDs configuration in FIG. 3, other variations can be implemented, such as using additional or alternate logic gates (e.g., inverters, NANDs, NORs, XORs), timing elements such as flip-flops or counters, edge detectors, filters, and/or multiple thresholds. For instance, logic elements can be chained such that a sequence of events or a time constrained sequence triggers the external sever status 310 and the internal sever status 312.

Referring now to FIG. 4, with continued reference to FIGS. 1-3. FIG. 4 shows a method 400 of configuring and triggering a sever command using the configurable sever logic circuit 218 of FIG. 2 according to an embodiment.

At block 402, a plurality of loadable configuration data 216 is transferred from a non-volatile storage device 214 to a configurable sever logic circuit 218. At block 404, a plurality of module-level sever logic inputs 220 is mapped to a plurality of module-specific sever logic functions as defined in the loadable configuration data 216. At block 406, the module-level sever logic inputs 220 are monitored by the configurable sever logic circuit 218 based on the module-specific sever logic functions for a sever condition. The sever condition can be defined as a condition in which one or more of the effectors 104 should be disabled from operation.

At block 408, a sever command 212 can be triggered to disconnect one or more outputs 208 of a plurality of modules 204 based on the module-specific sever logic functions and the module-level sever logic inputs 220. As previously described, the triggering of the at least one sever command 212 to disconnect the one or more outputs 208 of the modules 204 can be based on a remote sever status 222 indicative of a secondary controller capability to control one or more effectors 104 associated with the one or more outputs 208 and/or the triggering of the at least one sever command 212 to disconnect the one or more outputs 208 of the modules 204 can be further based on an external sever command 226 in combination with the remote sever status 222 and the module-level sever logic inputs 220.

While the above description has described the flow process of FIG. 4 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A sever system, comprising:
a non-volatile storage device comprising a plurality of loadable configuration data; and
a configurable sever logic circuit coupled to a plurality of modules, each of the modules comprising a local module sever logic circuit with one or more diagnostic test interfaces to support local testing of the modules, the configurable sever logic circuit configured responsive to a transfer of the loadable configuration data to perform a plurality of operations comprising:
mapping a plurality of module-level sever logic inputs to a plurality of module-specific sever logic functions as defined in the loadable configuration data;
monitoring the module-level sever logic inputs by the configurable sever logic circuit based on the module-specific sever logic functions for a sever condition, wherein the module-level sever logic inputs comprise results of one or more diagnostic tests received from the one or more diagnostic test interfaces of the modules; and
triggering at least one sever command to disconnect one or more outputs of the modules based on the module-specific sever logic functions and the module-level sever logic inputs.

2. The sever system of claim 1, wherein the configurable sever logic circuit is incorporated in a controller line replaceable unit and the modules comprise circuit boards within the controller line replaceable unit.

3. The sever system of claim 1, wherein the module-specific sever logic functions comprise combinational logic that defines one or more conditions to trigger disconnection of the one or more outputs of the modules.

4. The sever system of claim 1, wherein the triggering of the at least one sever command to disconnect the one or more outputs of the modules is further based on a remote sever status indicative of a secondary controller capability to control one or more effectors associated with the one or more outputs.

5. The sever system of claim 4, wherein a status of the at least one sever command is provided to the secondary controller.

6. The sever system of claim 4, wherein the triggering of the at least one sever command to disconnect the one or more outputs of the modules is further based on an external sever command in combination with the remote sever status and the module-level sever logic inputs.

7. A control system for an aircraft, the control system comprising:
a plurality of effectors; and
a controller line replaceable unit of the aircraft operably coupled to the effectors, the controller line replaceable unit comprising:
a non-volatile storage device comprising a plurality of loadable configuration data; and
a configurable sever logic circuit coupled to a plurality of modules, each of the modules comprising a local module sever logic circuit with one or more diagnostic test interfaces to support local testing of the modules, the configurable sever logic circuit configured responsive to a transfer of the loadable configuration data to perform a plurality of operations comprising:
mapping a plurality of module-level sever logic inputs to a plurality of module-specific sever logic functions as defined in the loadable configuration data;
monitoring the module-level sever logic inputs by the configurable sever logic circuit based on the module-specific sever logic functions for a sever condition, wherein the module-level sever logic inputs comprise results of one or more diagnostic tests received from the one or more diagnostic test interfaces of the modules; and
triggering at least one sever command to disconnect one or more outputs of the modules based on the module-specific sever logic functions and the module-level sever logic inputs.

8. The control system of claim 7, wherein the module-specific sever logic functions comprise combinational logic that defines one or more conditions to trigger disconnection of the one or more outputs of the modules, and the modules comprise circuit boards within the controller line replaceable unit.

9. The control system of claim 7, wherein the triggering of the at least one sever command to disconnect the one or more outputs of the modules is further based on a remote sever status indicative of a secondary controller capability to control one or more effectors associated with the one or more outputs, and a status of the at least one sever command is provided to the secondary controller.

10. The control system of claim 9, wherein the triggering of the at least one sever command to disconnect the one or more outputs of the modules is further based on an external sever command in combination with the remote sever status and the module-level sever logic inputs.

11. A method comprising:
transferring a plurality of loadable configuration data from a non-volatile storage device to a configurable sever logic circuit, wherein the configurable sever logic circuit is coupled to a plurality of modules, each of the modules comprising a local module sever logic circuit with one or more diagnostic test interfaces to support local testing of the modules;
mapping a plurality of module-level sever logic inputs to a plurality of module-specific sever logic functions as defined in the loadable configuration data;
monitoring the module-level sever logic inputs by the configurable sever logic circuit based on the module-specific sever logic functions for a sever condition, wherein the module-level sever logic inputs comprise results of one or more diagnostic tests received from the one or more diagnostic test interfaces of the modules; and
triggering a sever command to disconnect one or more outputs of the modules based on the module-specific sever logic functions and the module-level sever logic inputs.

12. The method of claim 11, wherein the configurable sever logic circuit is incorporated in a controller line replaceable unit and the modules comprise circuit boards within the controller line replaceable unit.

13. The method of claim 11, wherein the module-specific sever logic functions comprise combinational logic that defines one or more conditions to trigger disconnection of the one or more outputs of the modules.

14. The method of claim 11, wherein the one or more diagnostic tests comprise one or more of: a watchdog timer test, a power supply test, a current test, a voltage test, a temperature test, a processing system test, a memory system test, a communication system test, an interface test, an input/output test, and a clock frequency/drift test.

15. The method of claim 11, wherein the triggering of the at least one sever command to disconnect the one or more outputs of the modules is further based on a remote sever status indicative of a secondary controller capability to control one or more effectors associated with the one or more outputs.

16. The method of claim 15, further comprising:
providing a status of the at least one sever command to the secondary controller.

17. The method of claim 15, wherein the triggering of the at least one sever command to disconnect the one or more outputs of the modules is further based on an external sever command in combination with the remote sever status and the module-level sever logic inputs.

* * * * *